(12) United States Patent
Drewes et al.

(10) Patent No.: US 10,363,791 B2
(45) Date of Patent: Jul. 30, 2019

(54) AXLE UNIT FOR COMMERCIAL VEHICLES

(71) Applicant: SAF-HOLLAND GmbH, Bessenbach (DE)

(72) Inventors: Olaf Drewes, Aschaffenburg (DE); Thomas Naber, Ahaus (DE)

(73) Assignee: SAF-HOLLAND GMBH, Bessenbach (DE)

( * ) Notice: Subject to any disclaimer, the term of this patent is extended or adjusted under 35 U.S.C. 154(b) by 8 days.

(21) Appl. No.: 14/356,326

(22) PCT Filed: Oct. 10, 2012

(86) PCT No.: PCT/EP2012/069987
§ 371 (c)(1),
(2) Date: May 5, 2014

(87) PCT Pub. No.: WO2013/072141
PCT Pub. Date: May 23, 2013

(65) Prior Publication Data
US 2015/0054245 A1 Feb. 26, 2015

(30) Foreign Application Priority Data
Nov. 16, 2011 (DE) .................. 10 2011 086 480

(51) Int. Cl.
*B60G 9/00* (2006.01)
*B60G 21/05* (2006.01)

(52) U.S. Cl.
CPC ............. *B60G 21/05* (2013.01); *B60G 9/003* (2013.01); *B60G 21/051* (2013.01); *B60G 2200/31* (2013.01); *B60G 2202/152* (2013.01)

(58) Field of Classification Search
CPC ...... B60G 21/05; B60G 21/051; B60G 9/003; B60G 2200/31; B60G 2202/152
See application file for complete search history.

(56) References Cited

U.S. PATENT DOCUMENTS

| 5,016,912 A | 5/1991 | Smith et al. |
| 5,778,798 A | 7/1998 | VanDenberg |

(Continued)

FOREIGN PATENT DOCUMENTS

| DE | 7414826 | 10/1974 |
| DE | 2736806 | 2/1978 |

(Continued)

OTHER PUBLICATIONS

European Patent Office, International Search Report, dated Jan. 30, 2013.

*Primary Examiner* — Paul N Dickson
*Assistant Examiner* — Joselynn Y Sliteris
(74) *Attorney, Agent, or Firm* — Price Heneveld LLP

(57) ABSTRACT

The invention relates to an axle assembly for commercial vehicles includes a linkage element, a first axle element and a second axle element, wherein the first axle element substantially extends along a tube axis and can be fastened on a first side of the linkage element, wherein the second axle element is shaped at least in regions rotationally symmetrically around the stub axis and can be fastened on a second side of the linkage element, wherein the tube axis and the stub axis are separated from one another in the region of the linkage element, and wherein a receiving section is provided which can be fastened to at least one of the elements in order to provide a bearing for a spring element such that a first plane of the spring element is cut at least in regions by one of the axes.

10 Claims, 2 Drawing Sheets

(56) References Cited

U.S. PATENT DOCUMENTS

| | | | | |
|---|---|---|---|---|
| 6,086,162 | A * | 7/2000 | Pinch | B60G 3/145 228/185 |
| 6,702,308 | B2 * | 3/2004 | Yamaguchi | B60G 7/001 280/124.11 |
| 7,044,565 | B2 * | 5/2006 | Kang | B60B 35/04 280/124.106 |
| 7,556,272 | B2 * | 7/2009 | Marchel | B60G 21/051 280/124.103 |
| 7,871,093 | B2 * | 1/2011 | Ogawa | B60G 7/00 280/124.11 |
| 8,046,893 | B2 * | 11/2011 | Criqui | B60G 21/051 156/212 |
| 8,308,175 | B2 * | 11/2012 | Choi | B60G 21/051 280/124.106 |
| 8,475,075 | B2 * | 7/2013 | Toepker | B23K 11/14 403/271 |
| 9,174,506 | B2 * | 11/2015 | Drewes | B60G 7/001 |
| 2010/0207346 | A1 | 8/2010 | VanDenberg et al. | |
| 2010/0270766 | A1 | 10/2010 | VanDenberg et al. | |
| 2011/0115183 | A1 * | 5/2011 | Alesso | B60G 21/051 280/124.106 |
| 2013/0234499 | A1 * | 9/2013 | Lee | B60G 21/051 301/124.1 |

FOREIGN PATENT DOCUMENTS

| | | |
|---|---|---|
| DE | 10254556 | 7/2003 |
| DE | 60104065 | 8/2005 |
| DE | 60020429 | 11/2005 |
| WO | 02066270 | 8/2002 |

\* cited by examiner

AXLE UNIT FOR COMMERCIAL VEHICLES

BACKGROUND OF THE INVENTION

The present invention relates to an axle assembly for commercial vehicles.

Axle assemblies for commercial vehicles are known from prior art, where preferentially the axle of a commercial vehicle is fixed to the chassis of the vehicle through a linkage element and a suspension element. As a further development, it has been tried to reduce weight and the space required for the installation of the trailing arm, for example, by mounting the suspension element immediately to the rigid axle. This, however, crops up the problem that the overall height of the axle assembly is increased significantly and the remaining useful space of the commercial vehicle is reduced. Furthermore, an axle design which is too low crops up the problem that the range of suspension required by the suspension element cannot be achieved any more.

Therefore, the objective of the present invention is to provide an axle assembly for commercial vehicles that reduces the weight and space requirements of the axle assembly on the one hand, and to ensure the required range of suspension while ensuring a low height of the axle assembly on the other.

SUMMARY OF THE INVENTION

According to the invention, the axle assembly for commercial vehicles includes a linkage element, a first axle element and a second axle element, where the first axle element extends mainly along a tube axle and can be fixed at a first side of the linkage element, and the second axle element is at least partially formed rotationally symmetric around a stub axle and is fixed on a second side of the linkage element, where the tube axle and the stub axle are spaced from each other and where a supporting section is provided, which can be fixed to at least one of the elements at least, in order to support a suspension element in such a way that a first surface of the suspension element is at least overlapped by of one of the axles or of the tube axle or the stub axle respectively. The first axle element is preferably a rigid axle or the axle tube of a commercial vehicle and is preferably fixed laterally to a linkage element. According to the invention, at the first axle element and opposing the linkage element side, a second axle element is provided and fixed to the linkage element. Here, the second axle element is preferably a stub axle, which is, at least partially, rotationally symmetric around a stub axle and which is mainly intended to bear a wheel of the commercial vehicle rotatably to the stub axle.

Expediently, the linkage element is swivel-mounted at a first distal end to the chassis of the commercial vehicle, where opposite the first distal end the supporting section is provided, to which a suspension element can take effect, in order to absorb movements of the linkage element in relation to the chassis of the vehicle. The first surface of the suspension element can preferably be the outside surface of a cylinder which surrounds the suspension element, and where, in particular, the axis of the cylinder is directed preferably in a mainly vertical direction. According to the invention, the supporting section is arranged at the linkage element or at the first axle element or at the second axle element in such a way that the first surface of the suspension element is at least partially overlapped by at least one of the tube or stub axles. With this arrangement of the two axle elements and the supporting section at the linkage element, the axle assembly is very compact in an advantageous manner, where, in particular, the length, i.e. the substantially horizontal extension, which is transversely to the stub axle or in longitudinal direction of the commercial vehicle, can be significantly reduced. Preferably, together with the reduction of the length of the linkage element, also its weight decreases. Preferably, by keeping the distance of the seating section of the stub axle small and, thus, keeping the lever arm low for forces which affect the second axle element and the seating section, the bending stresses that affect the linkage element can be reduced. As a result, advantageously the necessary cross-sectional thickness of the linkage element can be reduced, which leads to further reduction of the weight of the linkage element. In order to fix the wheel of the commercial vehicle to the chassis in a known manner, it is appropriate to arrange the linkage element to the commercial vehicle in such a way that the second side, at which the second axle element can be fixed to the linkage element is aligned to the outside or to the wheel of the commercial vehicle.

Preferably, the stub axle is spaced in the section of the linkage element with a vertical distance to the tube axle. In other words, this means that the first axle element and the axle tube are preferably spaced vertically to the second axle element. Depending on the geometric circumstances, the stub element or the second axle element can be provided relatively above or below the axle tube or on the first axle element in the area of the vehicle frame. In particular and preferably in order to reduce the height of the design of the axle assembly of the commercial vehicle, the stub axle can be arranged above the tube axle, where, in relation to the vehicle frame, the wheel of the vehicle is preferably arranged higher.

Since it is common that the axle tube is in contact or fixed to the bottom side of the vehicle frame, this way, the bottom side of the vehicle frame can be lowered relatively to the ground on which the vehicle stands or rolls, dependent on a given diameter of the wheel. In particular, at a predetermined maximum vehicle height which shall not be exceeded, the maximum height of the possible load capacity of the commercial vehicle can be increased this way.

In particular, it is preferred to space the stub axle with a horizontal distance to the tube axle in the area of the linkage element. In this design, in particular and preferably, the length of the linkage element can be reduced. Since this way the lever arms of the working forces can be reduced, the weight of the linkage element can be reduced at the same time. In order to force-fit the first and the second axle elements independently from each other or in consecutive order to the linkage element, both elements are arranged preferably transversely to the stub axle and in staggered manner. It is preferred in particular that the first or the second axle element, each at a mounting section, are inserted into the provided recess of the linkage element and that, for example, a bolt is inserted in opposite direction, which, in turn, enables a widening of the respective first mounting sections. By means of the preferred staggered arrangement of the first and the second axle elements, consequently, both elements can preferably be force-fitted in consecutive order to the linkage element control. Especially preferably, the first and the second axle elements have the same geometry of their respective mounting sections, so that only a forming machine or a bolt which is inserted into the respective mounting section by means of a press can be used to fix the first and the second axle elements to the linkage element. In particular, costs for machinery and tools can be saved this way.

It is preferred in particular that the ratio of the horizontal distance to the vertical distance is preferably in the range of 0-5, preferably in the range of 0.5-3, and especially preferably at approximately 1. By means of the preferred choice of the ratio of the horizontal distance to the vertical distance, the linkage element and especially the positions of the first and the second axle elements to be set at the linkage element and the seating section can be adapted to the specific geometry of the vehicle frame of the commercial vehicle and the expected load. With given loads on the linkage element or on the axle elements and on the seating section, limits for the maximum vertical or horizontal distances or their ratio are constituted this way. The larger these distances are, the higher are the torques and bending stresses to be expected, which act on the material of the linkage element. At a ratio of the horizontal distance (h) to the vertical distance of 0, the stub axle is arranged exactly above or below the tube axis, where, in particular, the height of the axle assembly of the commercial vehicle in adjustable to a preferred value. With a ratio of the horizontal distance to the vertical distance of 3-7, preferably of 5-6, consequently, the horizontal distance is significantly larger than the vertical distance of the two axles, where especially preferably, in relation to the distal end of the linkage element, the stub element and the second axle element are arranged before or behind the first axle element or the axle tube, respectively. Especially preferably, the ratio of the horizontal to the vertical distance are chosen is such a way that a favorable flow of forces is ensured from the second axle element to the seating section or to the first axle element via the linkage element.

In a preferred design, the stub shaft is arranged in parallel to the tube axle. It is preferred in particular that the tube axle runs along the rigid axle of the commercial vehicle, where a linkage element is attached at the respective ends of this rigid axle. In addition, at least two axle stub elements or second axle elements are provided, which are fixed to the respective linkage elements and which each serve as rotatable bearings of a wheel of the commercial vehicle.

Particularly it is preferred that the axle of rotation of the vehicle's wheels is arranged transversely or vertically to the longitudinal axis of the vehicle, where also the tube axle should be aligned transversely or vertically to the longitudinal axis of the vehicle. Thus, the stub axle is particularly preferably to be arranged in parallel to the tube axle. As an alternatively preferred design, the tube axle can be arranged at an angle greater than zero in relation to the stub axle. Especially preferably, the axle tube can be shaped in sections that are obliquely one to the other, e.g. v-shaped. It may be advantageous, for example, to convert the torsional load of the rigid axle at least partially into bending stresses by mounting or supporting the salient point of the axle at the underbody of the commercial vehicle.

Furthermore, it is preferred that the supporting section is spaced in vertical direction to the stub axle. In this respect, the vertical line to the ground on which the commercial vehicle moves is regarded as a vertical spacing or vertical direction, where a vertical displacement of the supporting section to the stub axle preferably affects the height of the design of the axle assembly with the attached suspension element. Especially preferably, the supporting section is arranged below or transversely below the stub axle, where, at the same time, the suspension element, which is attached to the supporting section, at a specified distance between the stub axle and the lower edge of the chassis, has each longer suspension travel available. In particular, suspension elements, more preferably air springs, can be used, which require a specific minimum design height to effectively perform an absorbing effect. Thus, by arranging the supporting section below the stub axle, it is ensured that the required minimum height for a suspension element is available and, at the same time, that the wheel is positioned as high as possible in relation to the vehicle frame, where, in turn, the available loading height of the vehicle is increased.

In a particularly preferred design, the stub axle is arranged in vertical direction above the supporting section and/or above the tube axis. It is preferred in particular that the stub axle is arranged as high as possible in relation to the linkage element and at the same time in relation to the tube axle and to the supporting section, in order to also fix a wheel of the vehicle as high as possible in relation to the vehicle chassis to the stub axle or the second axle element, respectively. At a fixed diameter of the vehicle wheel, this way the chassis of the commercial vehicle can preferably be lower to the ground on which the commercial vehicle moves. Here, it is particularly preferred that both the supporting section and the first axle element or the tube axle are arranged below the stub axle.

In a particularly preferred design, the supporting section at the same level as the linkage element, where the first axle element and the second axle element are force- and/or form-fitted to the linkage element. To facilitate the production of the axle assembly, it is especially preferred that the linkage element and the supporting section are at the same level. This can be achieved especially preferably by designing the supporting section and the linkage element as a one-piece cast part. In another process step, the first and second axle elements can be force-fitted or material bond to the compound arrangement of linkage element and supporting section. A force-fitted bonding of one of the axle elements and the linkage element can, in particular be achieved by forming and especially preferably by widening a tube section of the first or the second axle element, where this force-fitted bonding may advantageously be supported by an adhesive or an adhesive layer. Alternatively, it is preferred to fix the first and/or the second axle element to the linkage element by means of friction welding, in particular by friction stir welding.

In a particularly preferred design, the suspension element is a suspension bag, where the first surface of the suspension element is preferably the outer surface of a cylinder that surrounds the suspension bag. Particularly preferred, the cylinder surrounding the suspension bag is aligned vertically, which means that the axis of the cylinder extends transversely to the stub axle or transversely to the tube axle and mainly vertically to the ground on which the commercial vehicle stands or rolls. In an additionally preferred, barrel-shaped suspension bag design, the diameter of the surrounding cylinder corresponds preferably to the maximum diameter of the suspension bag, so that the first surface intersects or touches the suspension bag at its widest or thickest point. Alternatively, preferably, the suspension element may also be a coil spring, where the first surface is the outer surface of a cylinder which is stretched by the coil spring.

Advantageously, the supporting section has at least partially a flat surface, where the orthogonal distance is chosen in such a way that the suspension element can be mounted to the supporting section with a suspension height. In other words, the distance of the area of the supporting section, to which the suspension element acts from the tube axle or the upper side of the first axle element, corresponds mainly to the suspension height available for the suspension element. This is particularly the case, when the suspension element and the first axle element affect the chassis of the commercial vehicle at the same vertical height. Especially preferred as an orthogonal distance is in particular the distance between the partially flat surface of the supporting section and the tube axle.

Especially preferably, the linkage element is a continuous profile, which is at least supported along a curved line in the area of the axle elements and the supporting section, where the cross sectional thickness of the profile sections is chosen in such a way that the material stresses are minimized. According to design theory, such a support is the creation of a three-dimensional body out of a two-dimensional profile, which imaginarily is moved along a path. The body formed or created this way has sectional plane geometries according to the sectional planes, which are perpendicular to the supporting line, and which correspond to the previously described two-dimensional profile. A circular ring along an S-shaped curved path, for example, in this sense results in an S-shaped curved tube. Especially preferred, the two-dimensional profile can be variable in its course along the supporting line in its size and/or its form and/or its orientation. So, for example, along the support line a circular profile can have a smooth transition another towards a different profile, for example rectangular or oval, for example rectangular or oval. Especially in comparison to a continuous axle of a commercial vehicle, a tube-shaped profile supported along a curved line, may reach a similarly high stability while having a more favorable arrangement of the seating section for an air spring and/or the stub axle. Preferably by avoiding grooves and local material debilitations, additional bending moments created by the curved geometry can be transmitted better. Here, it may particularly be preferred that the support line at first runs in parallel to the tube axle, then curved and eventually in parallel to the stub axle. Then, the thicknesses of the sections of the axle elements and the linkage element that are in series or, in other words, "strung together" are, in accordance with the expected acting moments, transversely to the support line larger or smaller. The curved section of the support line preferably has vectorial components in vertical and, most preferably, also in horizontal direction.

Other advantages and features of the present invention arise from the following description with reference to the attached figures. It goes without saying that individual features of the figures shown can be combined within the scope of the invention.

DETAILED DESCRIPTION OF THE PREFERRED EMBODIMENTS

Figure 1:
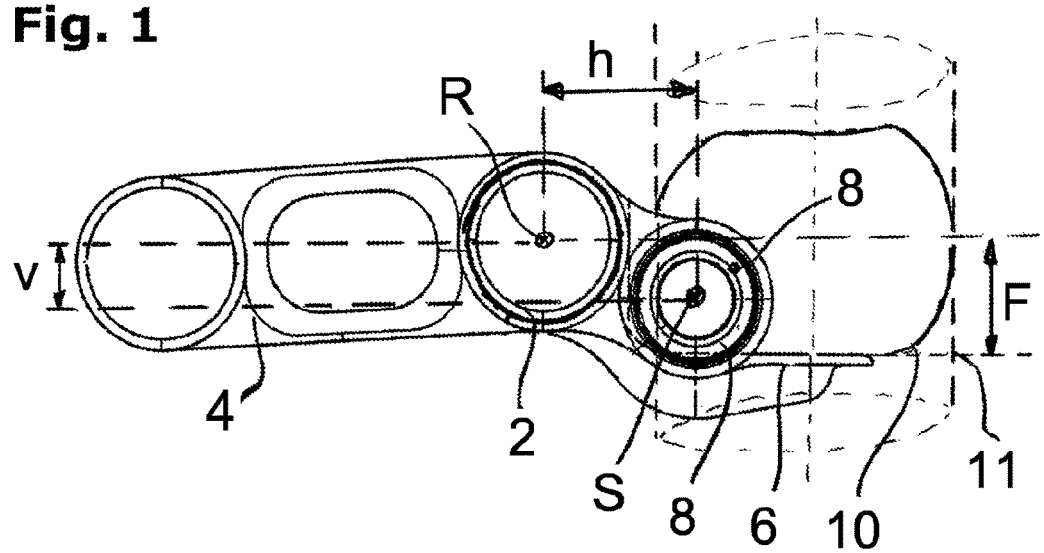
FIG. 1 is a side view of a preferred design of the axle assembly according to the invention.

The axle assembly shown in FIG. 1 has, according to the invention, a linkage element 4, a first axle element 2 and a second axle element 8. As shown, the first and the second axle elements 2, 8, are preferably designed circularly or preferably cylinder-shaped or tubular. The first axle element 2 extends mainly along the tube axle R, and the second axle element 8 extends mainly along the stub axle S. In the area of the linkage element 4, the tube axle R and the stub axle S are spaced one from the other by a vertical distance v. Also preferably, the tube axle R and the stub axle S are also spaced one from the other by a horizontal distance. According to the geometric conditions of the chassis of the commercial vehicle and according to the loads to be transported by the commercial vehicle, the ratio of v and h can be provided preferably in the range of 0-5. At its distal end shown in the figure on the left, the linkage element 4 has a section for mounting the linkage element 4 to the chassis of the commercial vehicle. This mounting section is particularly preferably designed sleeve-like and can, for example, host a rubber socket, in order to bear the linkage element 4 elastically and pivoted. On its opposite end, shown in the figure at the right, the linkage element 4 has a supporting section 6 where, in the preferred design shown, the supporting section 6 and the linkage element 4 are shaped as a single piece. Alternatively preferably, the supporting section 6 can be a separate component, which can be fixed to the linkage element 4 by means of a welding procedure. Besides of bearing the suspension element 10, the supporting section 6 is used preferably for reinforcing the linkage element 4, i.e. especially in an area where the linkage element 4 has material debilitations the seating section absorbs forces and moments. Moreover, the supporting section 6 has a mainly flat surface, where a suspension element 10 engages or is mounted, in order to absorb swiveling movements of the linkage element 4 in relation to the chassis of the vehicle. Especially preferably, the suspension element 10 is barrel-shaped, where it is overlapped at its thickest point, i.e. in the position of maximum horizontal extension, by a cylinder with an outer surface 11. From the preferred design is clearly evident that the outer surface 11 of the imaginary cylinder, which overlaps the suspension element 10, is at least partially overlapped by at least one of the axles R or S. In the preferred design shown, axle S overlaps the cylinder or the outer surface of the cylinder, respectively. Furthermore, it is clearly evident that the supporting section 6 has an orthogonal distance F at its mainly flat surface to the tube axle R. Here, the orthogonal distance F is a measure of the vertical offset of the supporting section 6 in relation to the tube axle R, or relatively to the chassis. The greater the distance F, the higher is the potential suspension height of the suspension element 10.

Figure 2:
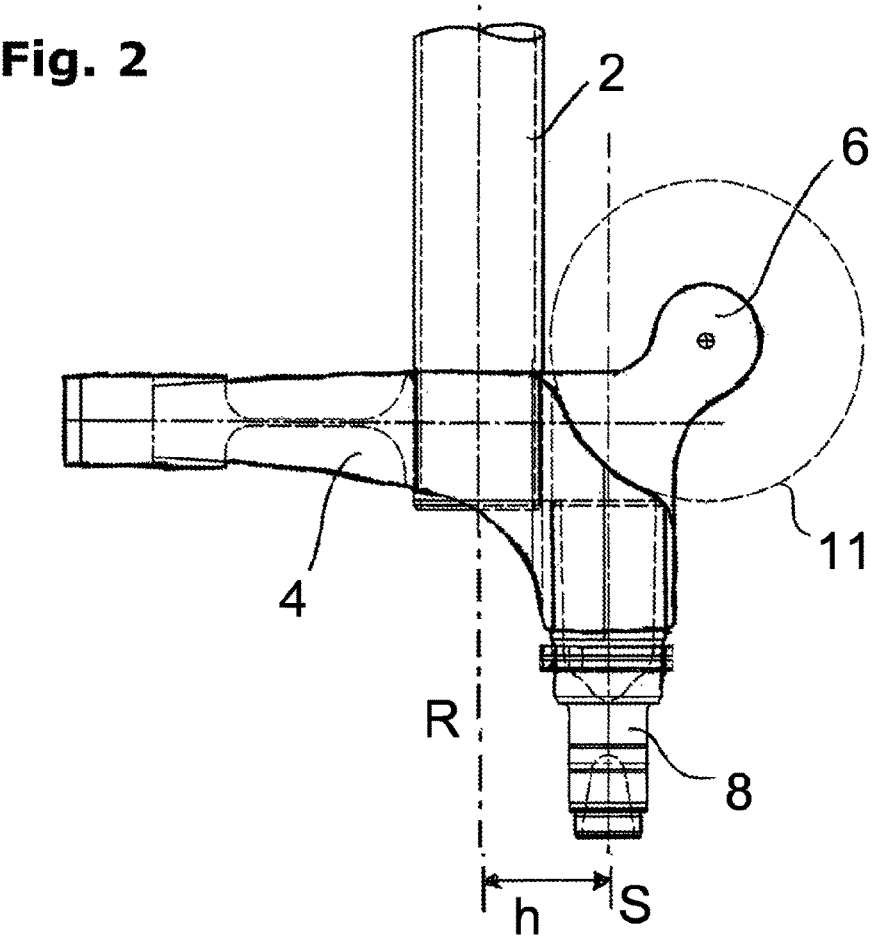
FIG. 2 is a top view of the preferred design of FIG. 1.

FIG. 2 shows a top view of the preferred design already shown in FIG. 1, where the first axle element 2 extends mainly along a tube axle R and the second axle element 8 has a section that is formed essentially rotationally symmetric around a stub axle S. The axles R and S are arranged offset one to the other, where the distance shown in the Figure is the horizontal distance h between the two axles. This distance has an impact on the power of the bending moments acting on the two axle elements and the supporting section 6 or the linkage element 4, respectively. The larger the distance h of the tube axle R and the stub axle S is, the larger are the maximum expected bending moments. In addition, it is clearly evident that the linkage element 4 has preferably a geometry in accordance to the force or to the power flux, respectively, in the area between the first axle element 2 and the second axle element 8, where, in particular, a grooving effect by sharp edges is reduced and, instead, strongly rounded geometries are employed. Not to be seen in the figure is the suspension bag or the suspension element 10, respectively, which acts on the supporting section 6, where, instead, the outer surface of a cylinder which surrounds the suspension element 10 is shown.

Figure 3:
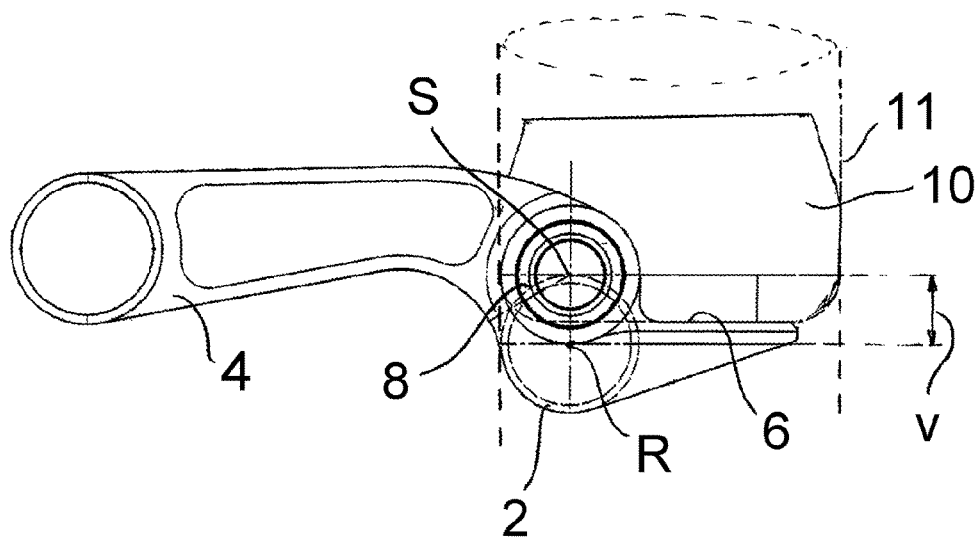
FIG. 3 is a side view of another preferred design of the axle assembly.

FIG. 3 shows a side view of a preferred design of the axle assembly, where the tube axle R and the stub axle S are preferably only offset vertically by a distance v. Below the supporting section 6 and in direction to the first axle element 2, a section with material reinforcement is shown which, in comparison to a continuous axle tube, compensates for the weakening of material made.

Figure 4:
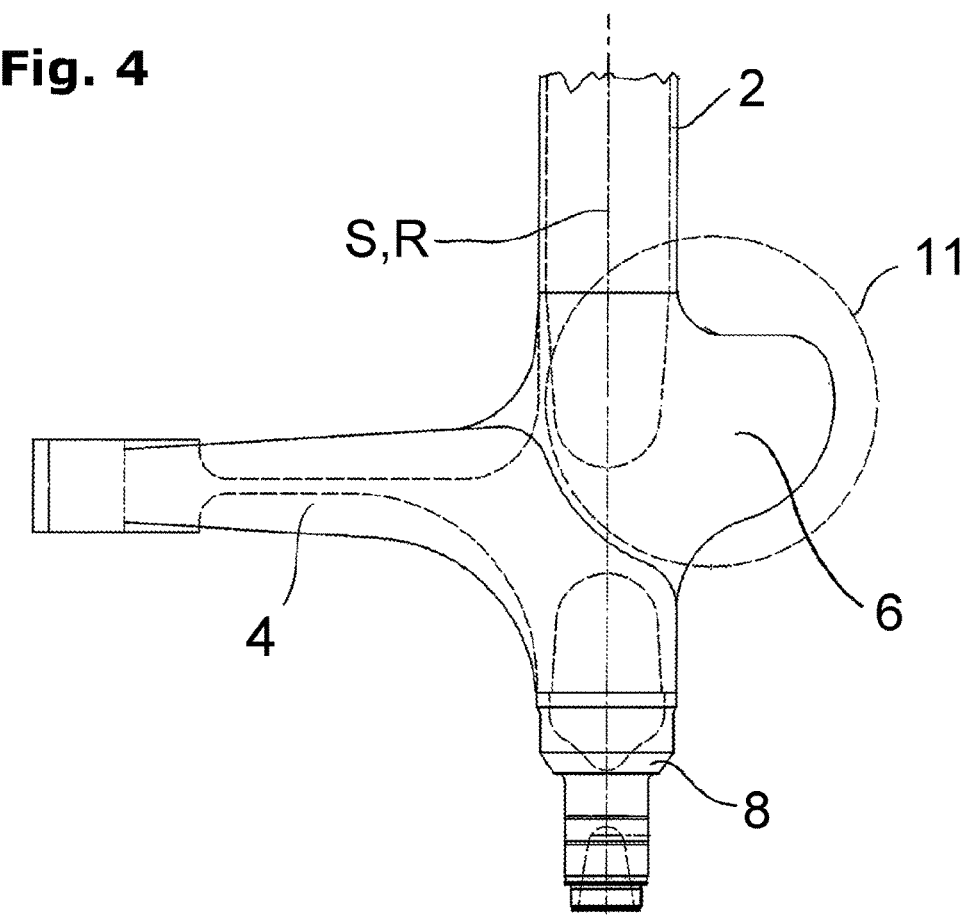
FIG. 4 is a top view of the preferred design shown in FIG. 3.

FIG. 4 shows the design illustrated in FIG. 3 in top view. It becomes evident that, for the preferred length reduction of linkage element 4, the supporting section 6 reaches almost completely into the area of the two axle elements 2, 8, where there is a material weakening in this area which is preferably to be compensated elsewhere. For this, curves with large radii are provided in the transition regions between the linkage element 4 and the first axle element 2 and the linkage element 4 and the second axle element 8. This way, on the one hand, the behavior of forces and moments in the axle assembly in improved and, on the other hand, the curves themselves act as a material reinforcement. Preferably, also the supporting section 6 increases the stability of the axle assembly.

LIST OF REFERENCE NUMBERS

2—first axle element
8—second axle element
4—linkage element
6—supporting section
10—suspension element
11—first surface of the suspension element
R—tube axle
S—stub axle
h—horizontal distance
v—vertical distance

The invention claimed is:

1. An axle assembly for commercial vehicles, comprising:
a linkage element having a first end and a second end;
a first axle element, wherein the linkage element extends between the first axle element and a vehicle frame, the linkage element is pivotably coupled to the vehicle frame at the first end and coupled to the first axle element near the second end; and
a second axle element, wherein the first and second axle elements are pivotably supported from the vehicle frame by the linkage element;
wherein the first axle element extends mainly along a tube axle and is fixed on a first side of the linkage element between the first and second ends of the linkage element;
wherein the second axle element is at least partially rotationally symmetric around a stub axle and is fixed at a second side of the linkage element between the first and second ends of the linkage element;
wherein the tube axle and the stub axle are spaced one from the other in an area of the linkage element;
wherein a supporting section is provided, which is configured as an integral one-piece part with the linkage element, so that a suspension element is supported in a way that a first surface of the suspension element is overlapped or intersected at least in parts by at least one of the tube axle and the stub axle;
wherein both the first axle element and the second axle element are directly and materially bonded to the linkage element;
wherein the stub axle in the area of the linkage element is spaced from the tube axle by a vertical distance v;
wherein the stub axle in the area of the linkage element is spaced from the tube axle by a horizontal distance h; and
wherein the ratio of the horizontal distance h to the vertical distance v is in the range of about 0 to about 5.

2. The axle assembly according to claim 1, wherein the ratio of the horizontal distance h to the vertical distance v is in the range of 0.5 to 3.

3. The axle assembly according to claim 2, wherein the ratio of the horizontal distance h to the vertical distance v is about 1.

4. The axle assembly according to claim 1, wherein the supporting section is positioned in a vertical distance to the stub axle.

5. The axle assembly according to claim 4, wherein the suspension element is a suspension bag, and wherein the first surface of the suspension element preferably is the outer surface of a cylinder which surrounds the suspension bag.

6. The axle assembly according to claim 5, wherein the supporting section has at least in some parts a level or flat surface, and wherein an orthogonal distance of the level surface and the tube axle is configured such that the suspension element can suspend within a suspension range between the supporting section and a fixing point on the commercial vehicle.

7. The axle assembly according to claim 6, wherein the linkage element comprises an integrated or continuous profile which supports along a curved line at least in the area of the axle elements and the supporting section, and wherein the cross-sectional thickness of the profile sections of the integrated profile is configured to minimize material tensions or material stresses.

8. The axle assembly according to claim 1, wherein the suspension element is a suspension bag, and wherein the first surface of the suspension element preferably is the outer surface of a cylinder which surrounds the suspension bag.

9. The axle assembly according to claim 1, wherein the supporting section has at least in some parts a level or flat surface, and wherein an orthogonal distance of the level surface and the tube axle is configured such that the suspension element can suspend within a suspension range between the supporting section and a fixing point on the commercial vehicle.

10. The axle assembly according to claim 1, wherein the linkage element comprises an integrated or continuous profile which supports along a curved line at least in the area of the axle elements and the supporting section, and wherein the cross-sectional thickness of the profile sections of the integrated profile is configured to minimize material tensions or material stresses.

* * * * *